United States Patent [19]

Rylatt

[11] Patent Number: 4,678,627
[45] Date of Patent: Jul. 7, 1987

[54] DEBRIS-RETAINING TRAP FOR A FUEL ASSEMBLY

[75] Inventor: John A. Rylatt, Monroeville Boro, Pa.

[73] Assignee: Westinghouse Electric Corp., Pittsburgh, Pa.

[21] Appl. No.: 720,109

[22] Filed: Apr. 4, 1985

[51] Int. Cl.⁴ .............................................. G21C 19/42
[52] U.S. Cl. .................................. 376/313; 376/316; 376/446
[58] Field of Search ................. 376/313, 316, 446, 280

[56] References Cited

U.S. PATENT DOCUMENTS

| | | | |
|---|---|---|---|
| 3,357,893 | 12/1967 | Gatley | 376/313 |
| 3,414,474 | 12/1968 | Swanson | 376/313 |
| 3,971,698 | 7/1976 | Wolff | 376/313 |
| 4,446,099 | 5/1984 | Schwind | 376/313 |

FOREIGN PATENT DOCUMENTS

| | | | |
|---|---|---|---|
| 2517479 | 4/1975 | Fed. Rep. of Germany . | |
| 847278 | 10/1939 | France . | |
| 1169479 | 12/1958 | France . | |
| 54-141989 | 5/1979 | Japan | 376/313 |
| 43604 | 7/1938 | Netherlands . | |
| 1214998 | 12/1970 | United Kingdom | 376/313 |

*Primary Examiner*—Donald P. Walsh

[57] ABSTRACT

A debris trap is mounted within a bottom nozzle of a fuel assembly so as to capture and retain debris carried by coolant flowing from the lower core plate openings of the nuclear reactor to the fuel assembly. The trap includes a hollow enclosure disposed below the bottom nozzle adapter plate and between the corner legs thereof. The enclosure is composed of upper and lower walls and inwardly inclined side walls which space apart the upper and lower walls and interconnect their peripheries so as to form a debris capturing and retaining chamber within the hollow enclosure. The walls are composed of a material, such as wire mesh screen and/or perforated plate, which is permeable to liquid coolant but impermeable to debris. Openings are defined in the bottom wall of the enclosure aligned with the flow openings of the core plate. Two embodiments of features are provided for capturing debris and diffusing coolant flow within and through the trap. In the preferred embodiment, lower bell mouthed rings are disposed on the lower wall about the respective openings and upper flared diffuser rings attached to corner pieces extend inwardly so as to overlie and align with the respective lower rings and openings. The lower rings prevent reverse movement of debris out of the enclosure through the openings, while the upper rings cause uniform distribution of coolant flow through the bottom nozzle. In the alternative embodiment, lower cylindrical rings on the lower wall about the openings and upper inverted cones on the upper wall and aligned with the lower rings and openings provide these respective functions.

22 Claims, 6 Drawing Figures

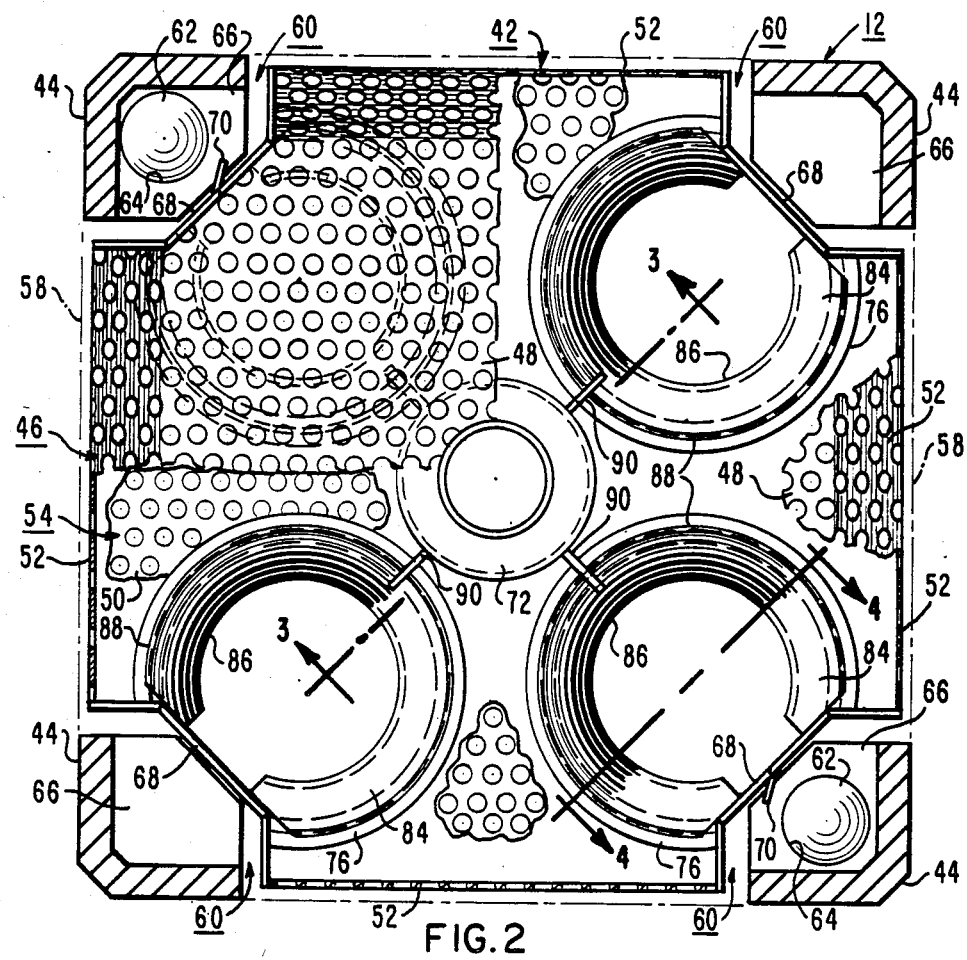
FIG. 2
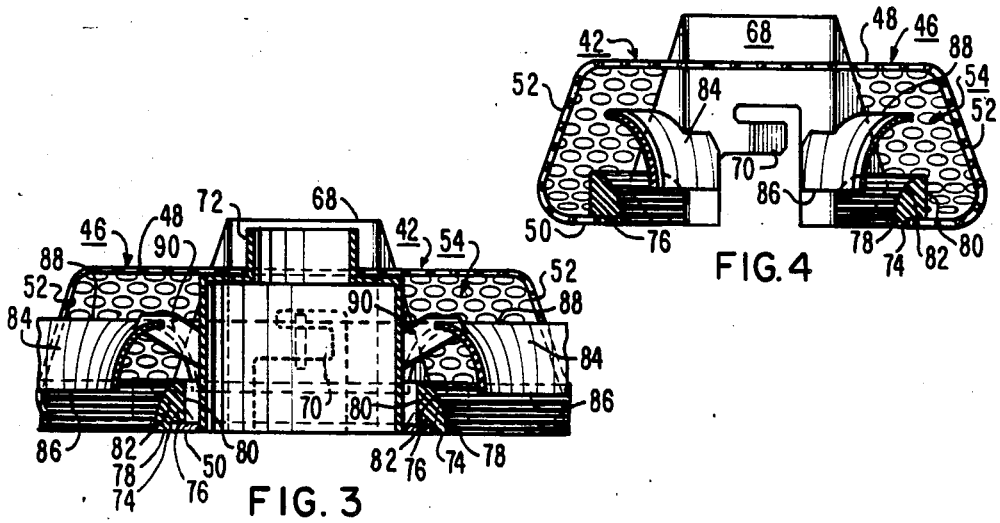
FIG. 3
FIG. 4

DEBRIS-RETAINING TRAP FOR A FUEL ASSEMBLY

CROSS REFERENCE TO RELATED APPLICATIONS

Reference is hereby made to the following copending applications dealing with related subject matter and assigned to the assignee of the present invention:

1 "Debris Trap For A Pressurized Water Nuclear Reactor" by John F. Wilson et al, assigned U.S. Ser. No. 672,040 and filed Nov. 16, 1984.

2. "Fuel Assembly Bottom Nozzle With Integral Debris Trap" by John F. Wilson et al, assigned U.S. Ser. No. 672,041 and filed Nov. 16, 1984.

3. "Wire Mesh Debris Trap For A Fuel Assembly" by William Bryan, assigned U.S. Ser. No. 679,511 and filed Dec. 7, 1984.

BACKGROUND OF THE INVENTION

1. Field of the Invention

The present invention relates generally to nuclear reactors and, more particularly, is concerned with a trap mounted in the bottom nozzle of a fuel assembly for capturing and retaining debris left in the reactor after assembly, repair and/or replacement operations and thereby preventing entry and lodging thereof in the fuel assembly where the debris can cause cladding perforations in the fuel rods and other damage to the fuel assembly.

2. Description of the Prior Art

During manufacture and subsequent installation and repair of components comprising a nuclear reactor coolant circulation system, diligent effort is made to help assure removal of all debris from the reactor vessel and its associated systems which circulate coolant therethrough under various operating conditions. Although elaborate procedures are carried out to help assure debris removal, experience shows that in spite of the safeguards used to effect such removal, some chips and metal particles still remain hidden in the system.

In particular, fuel assembly damage due to debris trapped at the bottom grid has been noted in several reactors in recent years. The damage consists of fuel rod tube perforations caused by fretting of debris in contact with the exterior of the tube. The debris tends to be relatively thin rectangular pieces, as opposed to pieces which are spherical in shape. Specifically, most of the debris consists of metal turnings which were probably left in the primary system after steam generator repair or replacement. The debris lodges in the region of the lowermost grid within the spaces between its "eggcrate" shaped cell walls and the lower end portions of the fuel rod tubes. Almost all of the debris is deposited just above the four coolant flow openings in the lower core support plate.

Several lower approaches have been proposed and tried for carrying out removal of debris from nuclear reactors. Many of these approaches are discussed in U.S. Pat. No. 4,096,032 to Mayers et al. While all of the approaches described in this patent operate reasonably well and generally achieve their objectives under the range of operating conditions for which they were designed, a need still exists for a fresh approach to the problem of debris removal in nuclear reactors, the new approach must be compatiable with the existing structure and operation of the components of the reactor, be effective throughout the operating cycle of the reactor, and at least provide overall benefits which outweight the costs it adds to the reactor.

SUMMARY OF THE INVENTION

The present invention provides a debrisretaining trap designed to satisfy the aforementioned needs. The debris trap has a hollow wire mesh and/or perforated plate enclosure, or cage, adapted to fit the present existing bottom nozzle of the fuel assembly without modification thereof. The trap is positioned between the adapter plate of the bottom nozzle and the upper surface of the lower core support plate such that entry openings of the trap which correspond in number and relative positions to the coolant flow openings in the lower core plate are aligned over the core plate openings. Two embodiments of the trap are disclosed having different features associated with the entry openings of the trap to diffuse and distribute coolant flow through the trap as well as only allow one-way movement of debris through the openings of the trap. Thus, the debris is retained within the hollow trap and fuel assembly at the next refueling, while pressure drop or loss across the trap is held to a minimum.

Accordingly, the present invention sets forth in a fuel assembly for a nuclear reactor including a plurality of nuclear fuel rods, at least one grid supporting the fuel rods in an organized array, and an end nozzle disposed adjacent the grid and liquid coolant flowing through the end nozzle and into the fuel assembly, a trap for capturing and retaining debris carried by the flowing coolant to prevent entry of debris into the fuel assembly. The debris trap includes: (a) a hollow enclosure disposed adjacent the end nozzle on an opposite side thereof from the grid, the enclosure being composed of a material which is permeable to the liquid coolant but impermeable to debris carried by the coolant; (b) the hollow enclosure has upper and lower walls spaced apart and interconnected at their peripheries so as to define a debris capturing and retaining chamber within the enclosure; (c) means on the hollow enclosure defining at least one opening into the chamber of the enclosure through the lower wall, the opening being disposed in a predetermined positional relationship with respect to the direction of coolant flow such that debris carried by the liquid coolant flow will enter the chamber of the enclosure through the opening; (d) lower means located within the chamber of the hollow enclosure and surrounding the opening into said chamber, the lower means having a configuration which serves to retain debris carried by coolant into the chamber through the opening from exiting through the opening; and (e) upper means located within the chamber of the hollow enclosure and being spaced generally above and aligned with the lower means and the opening, the upper means having a configuration which substantially uniformly distributes across the bottom nozzle the flow of coolant into the chamber through the opening.

More particularly, in a preferred embodiment, the lower means includes an annular bell mouthed ring attached to the lower wall about the opening therein, with the ring having an outer generally vertical annular wall and an inner generally outwardly and upwardly curved annular wall which merges with the outer wall at the respective upper edges thereof. The upper means includes a generally outwardly and upwardly flared annular diffuser ring spaced above the lower ring and opening and having opposite bottom and top edges with respective diameters less and greater than that of the opening, whereby some portions of coolant coming into the chamber through the opening can flow upwardly and outside of the diffuser ring, while other portions of coolant can flow upwardly through the diffuser ring. Also, the hollow enclosure includes at least one corner piece located adjacent the opening in the lower wall thereof, with the diffuser ring being attached to the corner piece so as to overlie the bell mouthed ring and opening in the aligned relationship therewith. Further, the corner piece has a bendable tab formed thereon for releasably locking the hollow enclosure within the end nozzle.

In an alternative embodiment, the lower means includes an annular cylindrical ring attached to the lower wall about the opening therein so as to form a lip about the opening, whereas the upper means includes an inverted cone attached to the upper wall of the hollow enclosure about and in alignment with the cylindrical ring and opening in the lower wall thereof. Preferably, the maximum diameter of the cone is less than that of the opening.

These and other advantages and attainments of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which:

FIG. 2 is an enlarged top plan view of the preferred embodiment of the debris trap as seen along line 2—2 of FIG. 1, illustrating the legs of the bottom nozzle of the fuel assembly, partly in sectional form, and only portions of the upper and lower walls of the hollow enclosure of the debris trap along with bell mouthed and diffuser rings associated with the flow entry openings of the trap.

FIG. 3 is a fragmentary view of the debris trap enclosure, partly in section, as seen along line 3—3 of FIG. 2, showing the bell mouthed rings attached to a base plate of the trap.

FIG. 4 is another fragmentary view of the debris trap enclosure, partly in section, as seen along line 4—4 of FIG. 2, showing the diffuser ring located above the bell mouthed ring and attached to a corner piece of the trap which has a locking tab.

DETAILED DESCRIPTION OF THE INVENTION

Figure 1:
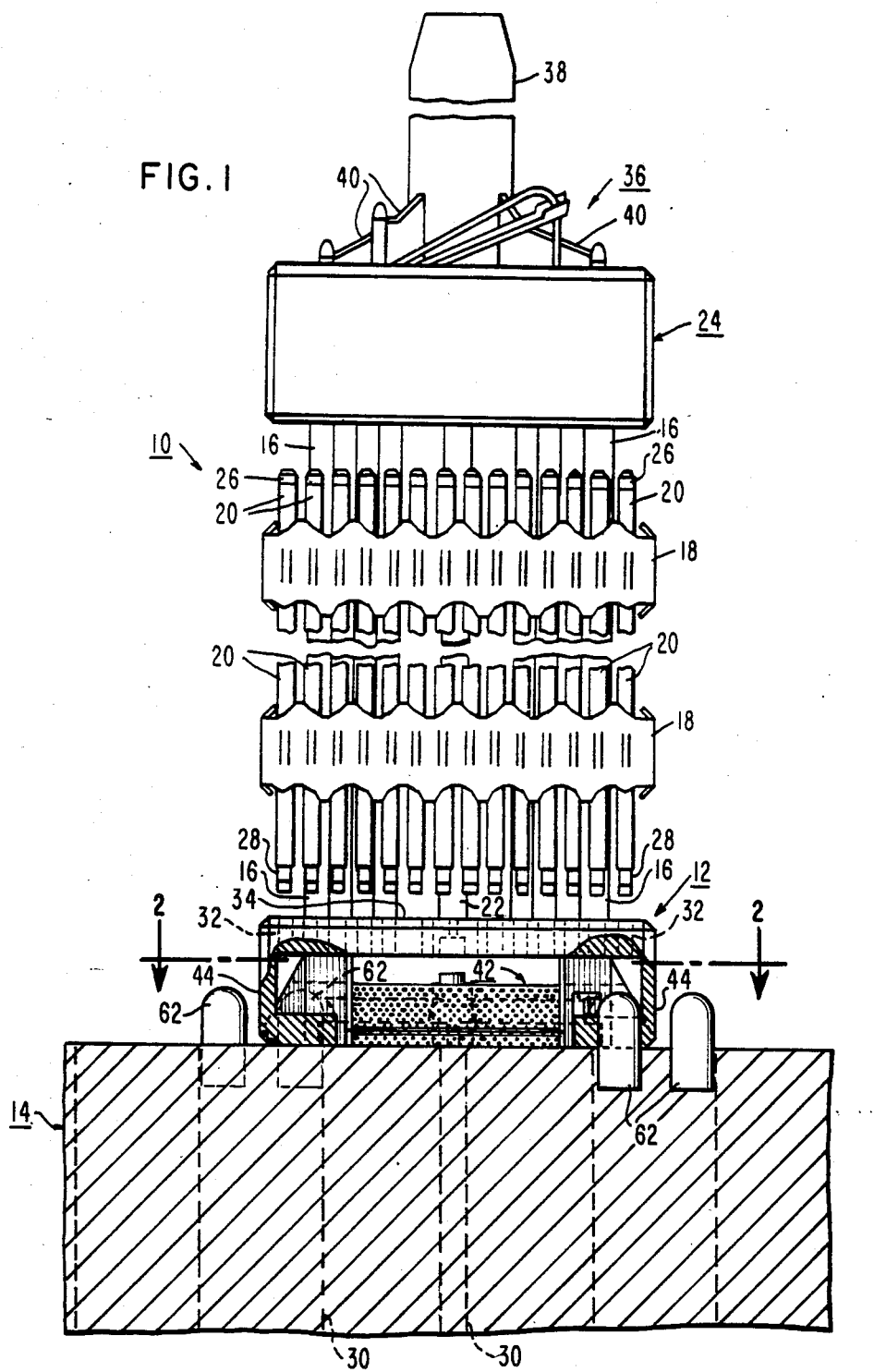
FIG. 1 is an elevational view, partly in section, of a fuel assembly in which is incorporated the preferred embodiment of the debris trap of the present invention, the assembly being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor and basically includes a lower end structure or bottom nozzle 12 for supporting the assembly on a lower core support plate 14 in the core region of a reactor (not shown), and a number of longitudinally extending guide tubes or thimbles 16 which project upwardly from the bottom nozzle 12. The assembly 10 further includes a plurality of transverse grids 18 axially spaced along the guide thimbles 16 and an organized array of elongated fuel rods 20 transversely spaced and axially supported by the grids 18. Also, the assembly 10 has an instrumentation tube 22 located in the center thereof and an upper end structure or top nozzle 24 attached to the upper ends of the guide thimbles 16. With such an arrangement of parts, the fuel assembly 10 forms an integral unit capable of being conventionally handled without damaging the assembly parts.

As mentioned above, the fuel rods 20 in the array thereof in the assembly 10 are held in spaced relationship with one another by the grids 18 spaced along the fuel assembly length. Each fuel rod 20 includes nuclear fuel pellets (not shown) and is closed at its opposite ends by upper and lower end plugs 26,28. The fuel pellets composed of fissile material are responsible for creating the reactive power of the reactor. A liquid moderator/coolant such as water, or water containing boron, is pumped upwardly through a plurality of flow openings 30 in the lower core plate 14 to the fuel assemblies. The bottom nozzle 12 of each assembly 10 has a series of flow holes 32 defined in its upper central adapter plate 34 through which the coolant flows upwardly through the guide thimbles 16 and along the fuel rods 20 of the fuel assembly in order to extract heat generated therein for the production of useful work.

To control the fission process, a number of control rods (not shown) are reciprocally movable in the guide thimbles 16 located at predetermined positions in the fuel assembly 10. Specifically, the top nozzle 24 includes a rod cluster control mechanism 36 having an internally threaded cylindrical member 38 with a plurality of radially extending flukes or arms 40. Each arm 40 is interconnected to a control rod such that the control mechanism 36 is operable to move the control rods vertically in the guide thimbles 16 to thereby control the fission process in the fuel assembly 10, all in a well-known manner.

PREFERRED EMBODIMENT OF DEBRIS-RETAINING TRAP

As mentioned above, fuel assembly damage due to debris trapped at the lowermost one of the grids 18 has been noticed in recent years. Therefore, to prevent occurrence of such damage, it is highly desirable to trap and remove this debris before it reaches the lowermost grid 18.

The present invention relates to a debris-retaining trap, generally indicated by the numeral 42, mounted inside or within the bottom nozzle 12 adjacent to and below its upper central adapter plate 34 and between its corner legs 44, as illustrated in FIG. 1. The trap 42 is positioned across the path of coolant flow from the lower core plate openings 30 to the adapter plate holes 32 so as to capture debris, such as small loose parts or pieces, from the flowing coolant and thereby prevent it from entering the fuel assembly 10. Instead, the debris is retained within the trap 42 which permits removal of the debris along with the trap 42 and fuel assembly 10 at the next refueling.

Turning now to FIGS. 2 to 4, there is illustrated a preferred embodiment of the debris trap 42 which includes a hollow enclosure 46 having upper and lower walls 48,50 and several side walls 52, preferably four in number, which interconnect the upper and lower walls at their respective peripheries and space them apart so as to define a debris capturing and retaining chamber, generally indicated 54, within the enclosure 46. The side walls 52 angle upwardly and inwardly from the lower wall 50 to the upper wall 48 so as to provide increased coolant flow through the enclosure 46. The walls 48,50,52 of the hollow enclosure 46 are composed of any suitable material permeable to the liquid coolant but impermeable to debris carried by the coolant. For instance, as illustrated, the walls can be composed of perforated sheet plate material; however, they may just as readily been composed of a wire mesh screen or layer material or a combination of the perforated sheet and wire mesh screen materials. For example, the bottom wall 50 could be made from perforated sheet material, while the rest of the walls 48,52 are made of wire mesh sheet material.

As seen in FIGS. 1 and 2, the debris trap enclosure 46 has overall cross-sectional dimensions sized to allow the enclosure to fit within the peripheral skirt 58 of the bottom nozzle 12 between the corner legs 44 thereof and extend generally coplanar with the adapter plate 34 of the nozzle. Generally notch-shaped depressions 60 are defined in the corners of the enclosure 46. One diagonal pair of the depressions 60 provide adequate space for a diagonal pair of alignment pins 62 which extend upright from the lower core plate 14 and fit through openings 64 formed through flanges 66 of one diagonal pair of the corner legs 44. Also, at each of the diagonally opposite corner depressions 60 of the enclosure 46, a corner piece 68 is disposed which interconnect the side walls 52 with one another. Although only shown with two of the pieces, each of the corner pieces 68 has locking means in the form of a bendable tab 70 defined thereon to engage the flanges 66 of the bottom nozzle 12 upon installation of the trap 42 therein. Preferably, in the installed position of the trap 42, the upper wall 48 of its enclosure 46 is spaced a short distance below the adapter plate 34 so that water flow through the holes 32 of the adapter plate is not obstructed.

The trap 42 is installed from the bottom of the fuel assembly 10 when the assembly has been removed from the reactor core. The tabs 70 are bent outwardly over the flanges 66 after the trap 42 is installed to lock it in place so that it can be moved with the fuel assembly 10. To remove the trap 42, a tapered wedge of plate material is inserted between each corner piece 68 and the inside of the flange 66. This forces the tab inwardly and allows withdrawal of the trap 42.

The hollow enclosure 46 of the debris trap 42 also has a central annular sleeve 72 mounted between the upper and lower walls 48,50 of the enclosure for two purposes. First, the sleeve 72 which rests on the lower core plate 14 serves to bolster the structural integrity of the hollow enclosure 46. Second, it allows access to the lower end of the instrumentation tube 22 to where it is attached to the bottom nozzle adapter plate 34.

The preferred embodiment of the debris trap 42, as seen in FIGS. 2 to 4, also includes a plurality of openings 74 into the chamber 54 of the enclosure 46 through its lower wall 50. The openings 74 are matched in number and alignment with the coolant flow openings 30 in the lower core plate 14 such that debris carried by liquid coolant flow from the core plate openings 30 will enter the chanber 54 of the enclosure 46 through the openings 74.

Also, the trap 42 includes lower means in the form of a plurality of annular bell mouthed rings 76 disposed within the chamber 54 of the enclosure 46. Each ring 76 has a lower flange 78 which snugly fits into one of the openings 74 when the ring is seated on and attached to the inner side of the lower wall 50 about the one opening 74. The ring 76, which surrounds the opening 74, has an outer generally vertical annular wall 80 which serves to retain debris carried by coolant into said chamber through the opening 74 and ring 76 from exiting back through the opening. The ring 76 also has an inner generally outwardly and upwardly curved annular wall 82 which merges with the outer wall 80 at the respective upper edges thereof.

Finally, the debris trap 42 includes upper means in the form of a plurality of generally outwardly and upwardly flared annular diffuser rings 84 located within the enclosure chamber 54 and spaced generally above and aligned, respectively, with the chamber openings 74 and the lower bell mouthed rings 76. Each of the diffuser rings 84 has opposite bottom and top edges 86,88 with respective diameters being less and greater than the minimum diameter of the lower bell mouthed ring 76. The curvature of the upper ring 84 is generally similar to that of the inner wall 82 of the lower ring 76. The configurations and spaced relationship of the lower and upper rings 76,84 allows some portions of coolant coming into the chamber 54 through the lower ring 76 and the opening 74 to flow upwardly outside of the diffuser ring 84 and through the space between the diffuser ring 84 and the bell mouthed ring 76, while other portions of coolant can flow upwardly directly through the diffuser ring 84. In such manner, the rings 76,84 coact to proportionately distribute and guide the incoming coolant stream so as to provide a substantially uniform distribution of coolant flow across the bottom nozzle 12. Since this flow distribution is performed using vane type flow guides, turning losses are minimized to the greatest extend possible.

Each of the diffuser rings 84 is supported at its opposite inner and outer sides by one of the corner pieces 68 which is located adjacent one of the openings 74 in the lower wall 50 and by a radial bracket 90 interconnected to the central sleeve 72. The diffuser rings 84 thus extend laterally between the respective corner pieces 68 and central sleeve 72 in overlying and aligned relationship to respective ones of the openings 74 and lower rings 76.

Thus, generally speaking, debris is retained within the trap 42 by the lower ring 76 which acts as a lip on the opening 74. However, some debris entrained in coolant which flows directly through the upper ring 84 is held up against the upper wall 48 and may fall back down through the opening 74 at reduced flow conditions such as are present during shut down of the main coolant pumps. In the latter instance, such debris still does not get into the fuel assembly and will be positioned for capture in the trap 42 at the next reactor start-up cycle. In the unlikely event that one trap becomes partially blocked such that there is a reduction in coolant flow-through, this design allows a free interchange of cross flow under the bottom nozzle 12 from the adjacent fuel assemblies to make up the short-fall.

The improvements provide by the above-described debris trap 42 over prior designs are as follows. First, the pressure loss or drop of the trap is reduced by a factor of at least three. Second, the addition of the flow distribution features reduces the pressure loss across the bottom nozzle. Third, mixing turbulence above the bottom nozzle is reduced significantly by the improved flow distribution under the bottom nozzle. This provides reduced pressure losses up to and at the first grid. Fourth, partial blockage of a given trap is offset by allowing cross flow under the bottom nozzle of filtered coolant from adjacent fuel assemblies. And, fifth, the combination of improvements provides the distinct possibility of near-zero insertion loss due to the trap. This is particularly desirable where not all fuel assemblies within the reactor core are fitted with the trap, and allows for the planned introduction of this component into an existing operating reactor.

ALTERNATIVE EMBODIMENT OF DEBRIS-RETAINING TRAP

Figure 5:
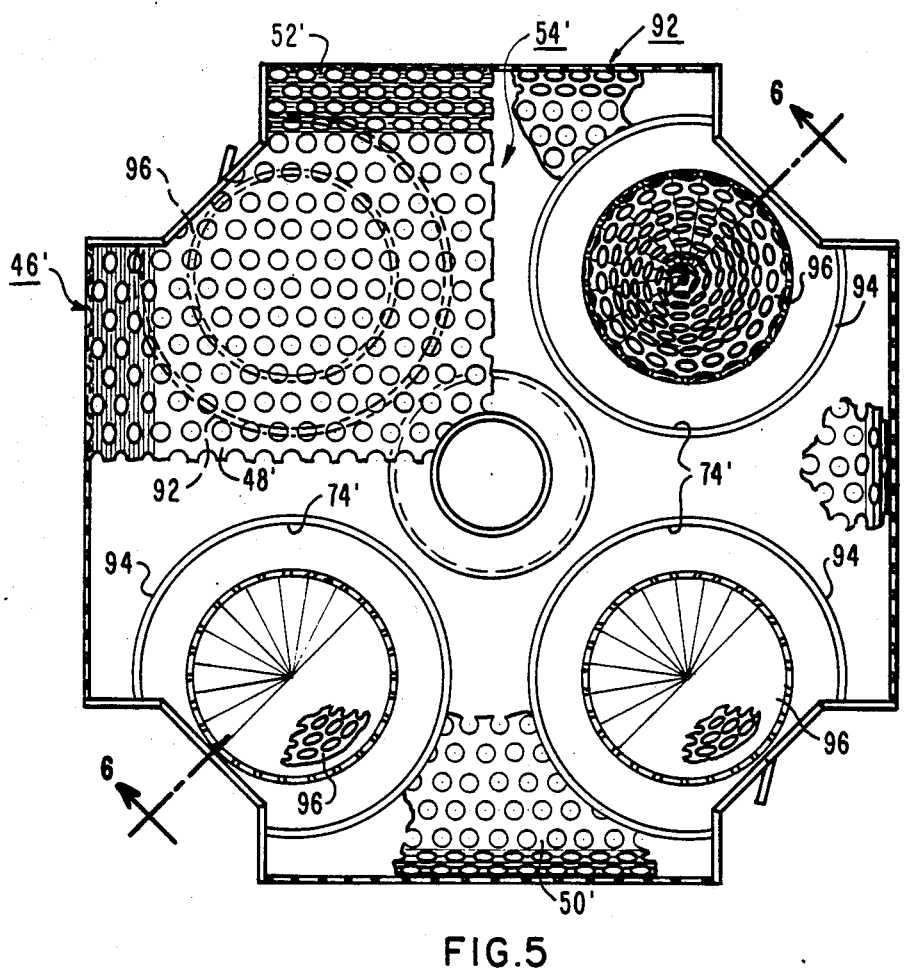
FIG. 5 is a top plan view of an alternative embodiment of the debris trap, illustrating only portions of the upper and lower walls of the hollow enclosure of the debris trap along with flow diffuser cones and debris retainer lips associated with the entry flow openings of the trap.
Figure 6:
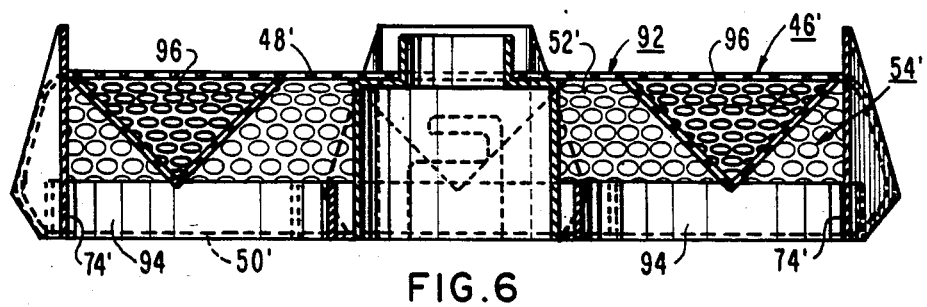
FIG. 6 is an elevational view of the alternative native embodiment of the debris trap, partly in section, as seen along line 6—6 of FIG. 5, showing the flow diffuser cones and debris retainer lips associated with the entry openings of the trap.

An alternative embodiment of a debris trap 92, illustrated in FIGS. 5 and 6, is generally similar to the preferred embodiment described above with respect to FIGS. 1 to 4. However, there are two features of the trap 92 which are modified in comparison to the earlier trap 42. These two features will be described hereafter.

First, the lower means of the trap 92 takes the form of a plurality of annular cylindrical rings 94 attached to the lower wall 50' and surrounding the respective openings 74' into the chamber 54'. Each of the cylindrical rings 94 has a configuration which forms a lip about the one opening 74' which serves to retain debris carried by coolant into the chamber 54' through the opening from exiting back through the opening. Second, the upper means is in the form of a plurality of inverted cones 96 spaced generally above and aligned with the respective lower cylindrical rings 94 and openings 74' and attached to the upper wall 48' of the hollow enclosure 46'. The configuration of each inverted cone 96 also achieves substantially uniform distribution of coolant, flowing into the chamber 54' through the opening 74', across the bottom nozzle 12. Specifically, each of the inverted cones 96 has a maximum diameter which is less than that of the opening 74' and is composed of the same material as the enclosure 46'.

While this design is somewhat simpler in its construction, it is expected to have a pressure drop somewhat larger than the preferred embodiment described earlier, although not necessarily unacceptable for the intended application.

It is thought that the debris trap of the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely exemplary embodiments thereof.

I claim:

1. In a fuel assembly for a nuclear reactor including a plurality of nuclear fuel rods, at least one grid supporting said fuel rods in an organized array, an end flowing through said end nozzle and into said fuel assembly, a trap for capturing and retaining debris carried by said flowing coolant to prevent entry of debris into said fuel assembly, said debris trap comprising:

(a) a hollow enclosure disposed adjacent said end nozzle on an opposite side thereof from said grid, said enclosure being composed of a material which is permeable to the liquid coolant but impermeable to debris carried by the coolant;

(b) said hollow enclosure having upper and lower walls spaced apart and interconnected at their peripheries so as to extend across the direction of liquid coolant flow through said end nozzle and define a debris capturing and retaining chamber within said enclosure;

(c) means on said hollow enclosure defining at least one opening into said chamber of said enclosure through said lower wall, said opening being of a size sufficient to allow passage of debris into said chamber which could not otherwise pass through said material of said hollow enclosure, said opening also being disposed in a predetermined positional relationship with respect to the direction of coolant flow such that debris carried by said liquid coolant flow will enter said chamber of said enclosure through said opening;

(d) lower debris-retaining means located within said chamber of said hollow enclosure and surrounding said opening into said chamber, said lower debris-retaining means having a configuration which serves to retain debris carried by coolant into said chamber through said opening from exiting through said opening; and (e) upper flow-diffusing means located within said chamber of said hollow enclosure and being spaced generally above and aligned with said lower debris-retaining means and said opening, said upper flow-diffusing means having a configuration which substantially uniformly distributes across the bottom nozzle the flow of coolant into said chamber through said opening.

2. The debris trap as recited in claim 1, wherein said material forming said hollow enclosure is perforated plate material.

3. The debris trap as recited in claim 1, further including a central annular sleeve mounted between said upper and lower walls of said hollow enclosure for bolstering the structural integrity of said hollow enclosure.

4. The debris trap as recited in claim 1, wherein said hollow enclosure has cross-sectional dimensions sized to fit said enclosure within said end nozzle and said trap further includes means on said enclosure for releasably locking it within said end nozzle.

5. The debris trap as recited in claim 4, wherein said locking means is in the form of a bendable tab disposed on opposite sides of said enclosure and engageable with said end nozzle upon installation of said enclosure in said end nozzle.

6. The debris trap as recited in claim 1, wherein said lower debris-retaining means includes an annular bell mouthed ring attached to said lower wall about said opening therein.

7. The debris trap as recited in claim 6, wherein said ring includes an outer generally vertical annular wall and an inner generally outwardly and upwardly curved annular wall which merges with said outer wall at the respective upper edges thereof.

8. The debris trap as recited in claim 1, wherein said lower debris-retaining means includes annular cylindrical ring attached to said lower wall about said opening therein so as to form a lip about said opening.

9. The debris trap as recited in claim 1, wherein said upper flow-diffusing means includes a generally outwardly and upwardly flared annular diffuser ring spaced above said opening and having opposite bottom and top edges, said bottom edge of said ring having a diameter less than that of said top edge and said opening, whereby some portions of coolant coming into said chamber through said opening can flow upwardly and outside of said diffuser ring, while other portions of coolant can flow upwardly through said diffuser ring.

10. The debris trap as recited in claim 9, wherein said hollow enclosure includes at least one corner piece located adjacent said opening in said lower wall thereof, said diffuser ring being attached to said corner piece so as to overlie said opening in said aligned relationship therewith.

11. The debris trap as recited in claim 10, wherein said corner piece has a bendable tab formed thereon for releasably locking said enclosure within said end nozzle.

12. The debris trap as recited in claim 1, wherein said upper flow-diffusing means includes an inverted cone attached to said upper wall of said hollow enclosure above said opening in said lower wall thereof.

13. The debris trap as recited in claim 12, wherein the maximum diameter of said cone is less than that of said opening.

14. The debris trap as recited in claim 12, wherein said cone is composed of the same material as said enclosure.

15. The debris trap as recited in claim 1, wherein said upper and lower walls of said hollow enclosure are spaced apart and interconnected at their peripheries by side walls which angle upwardly and inwardly so as to provide increased coolant flow through said enclosure.

16. In a fuel assembly for a nuclear reactor including a plurality of nuclear fuel rods, a plurality of grids axially disposed along and supporting said fuel rods in an organized array, and a bottom nozzle disposed adjacent a lowermost one of said grids and having a central adapter plate with a series of coolant flow holes defined therethrough and a plurality of legs extending downwardly from the periphery of said adapter plate for supporting said fuel assembly on a lower core support plate of said reactor and in alignment with a plurality of coolant flow openings in said lower core plate, and liquid coolant flowing through said openings in said lower core plate and said holes in said bottom nozzle adapter plate, a trap for capturing and retaining debris carried by said flowing coolant to prevent entry of debris into said fuel assembly, said debris trap comprising:

(a) a hollow enclosure disposed between said bottom nozzle adapter plate and said lower core plate and in a path of coolant flow from said openings in said core plate and to said holes in said adapter plate, said hollow enclosure being composed of a material which is permeable to the liquid coolant but impermeable to debris carried by the coolant;

(b) said hollow enclosure having upper and lower walls spaced apart and interconnected at their respective peripheries so as to extend across said path of coolant flow and define a debris capturing and retaining chamber within said enclosure;

(c) means on said hollow enclosure defining a plurality of openings into said chamber of said enclosure through said lower wall, said openings each being of a size sufficient to allow passage of debris into said chamber which could not otehrwise pass through said material of said hollow enclosure, said openings also being matched in number and alignment with said plurality of coolant flow openings in said lower core plate and disposed in a predetermined positional relationship with respect to the direction of coolant flow such that debris carried by said liquid coolant flow will enter said chamber of said enclosure through said openings thereof;

(d) lower debris-retaining means located within said chamber of said hollow enclosure and surrounding each of said openings into said chamber, said lower debris-retaining means having a configuration which serves to retain debris carried by coolant into said chamber through said openings from exiting through said openings, said lower debris-retaining means in the form of a plurality of annular bell mouthed rings, each ring being attached to said lower wall about one of said openings therein and having an outer generally vertical annular wall and an inner generally outwardly and upwardly curved annular wall which merges with said outer wall at the respective upper edge thereof; and (e) upper flow-diffusing means located within said chamber of said hollow enclosure and being in the form of a plurality of generally outwardly and upwardly flared annular diffuser rings spaced generally above and aligned with said lower bell mouthed rings and said openings, each of said diffuser rings having opposite bottom and top edges, said bottom and top edges of said each ring having respective diameters less and greater than that of said lower ring, whereby some portions of coolant coming into said chamber through said opening of said enclosure can flow upwardly and outside of said diffuser ring and through the space between said diffuser ring and said bell mouthed ring, while other portions of coolant can flow upwardly through said diffuser ring, thereby achieving a substantially uniform distribution of coolant flow into said chamber through said opening and across the bottom nozzle.

17. The debris trap as recited in claim 16, wherein said hollow enclosure includes a plurality of corner pieces located adjacent said openings in said lower wall thereof, each of said diffuser rings being attached to one of said corner pieces and extending laterally therefrom in overlying and aligned relationship to one of said openings.

18. The debris trap as recited in claim 17, wherein each of said corner pieces of said enclosure has locking means in the form of a bendable tab defined thereon, said each tab being engageable with said end nozzle upon installation of said enclosure in said end nozzle.

19. The debris trap as recited in claim 16, wherein said upper and lower walls of said hollow enclosure are spaced apart and interconnected at their peripheries by side walls which angle upwardly and inwardly so as to provide increased coolant flow through said enclosure.

20. In a fuel assembly for a nuclear reactor including a plurality of nuclear fuel rods, a plurality of grids axially disposed along and supporting said fuel rods in an organized array, and a bottom nozzle disposed adjacent a lowermost one of said grids and having a central adapter plate with a series of coolant flow holes defined therethrough and a plurality of legs extending downwardly from the periphery of said adapter plate for supporting said fuel assembly on a lower core support plate of said reactor and in alignment with a plurality of coolant flow openings in said lower core plate, and liquid coolant flowing through said openings in said lower core plate and said holes in said bottom nozzle adapter plate, a trap for capturing and retaining debris carried by said flowing coolant to prevent entry of debris into said fuel assembly, said debris trap comprising:
  (a) a hollow enclosure disposed between said bottom nozzle adapter plate and said lower core plate and in a path of coolant flow from said openings in said core plate and to said holes in said adapter plate, said hollow enclosure being composed of a material which is permeable to the liquid coolant but impermeable to debris carried by the coolant;
  (b) said hollow enclosure having upper and lower walls spaced apart and interconnected at their respective peripheries so as to extend across said path of coolant flow and define a debris capturing and retaining chamber within said enclosure;
  (c) means on said hollow enclosure defining a plurality of openings into said chamber of said enclosure through said lower wall, said openings each being of a size sufficient to allow passage of debris into said chamber which could not otherwise pass through said material of said hollow enclosure, said openings also being matched in number and alignment with said plurality of coolant flow openings in said lower core plate and disposed in a predetermined positional relationship with respect to the direction of coolant flow such that debris carried by said liquid coolant flow will enter said chamber of said enclosure through said openings thereof;
  (d) lower debris-retaining means located within said chamber of said hollow enclosure and being in the form of a plurality of annular cylindrical rings attached to said lower wall and surrounding said respective openings into said chamber, each of said cylindrical rings having a configuration which forms a lip about said one opening which serves to retain debris carried by coolant into said chamber through said opening from exiting through said opening; and
  (e) upper flow-diffusing means located within said chamber of said hollow enclosure and being in the form of a plurality of inverted cones spaced generally above and aligned with said lower cylindrical rings and openings and attached to said upper wall of said hollow enclosure, each inverted cone having a configuration which causes substantially uniform distribution of coolant flowing into said chamber through said opening and across said bottom nozzle.

21. The debris trap as recited in claim 20, wherein each of said inverted cones having a maximum diameter which is less than that of said opening and being composed of the same material as said enclosure.

22. The debris trap as recited in claim 20, wherein said upper and lower walls of said hollow enclosure are spaced apart and interconnected at their peripheries by side walls which angle upwardly and inwardly so as to provide increased coolant flow through said enclosure.

* * * * *